(12) United States Patent
Xu et al.

(10) Patent No.: US 6,988,201 B1
(45) Date of Patent: Jan. 17, 2006

(54) METHOD AND APPARATUS FOR WATERMARKING WAVETABLE SYNTHESIS ARCHITECTURES

(75) Inventors: Changsheng Xu, Singapore (SG); Jiankang Wu, Singapore (SG); Qibin Sun, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/445,139

(22) PCT Filed: Feb. 12, 1999

(86) PCT No.: PCT/SG99/00004

§ 371 (c)(1),
(2), (4) Date: Dec. 2, 1999

(87) PCT Pub. No.: WO00/45545

PCT Pub. Date: Aug. 3, 2000

(51) Int. Cl.
*H04L 9/00* (2006.01)
(52) U.S. Cl. .................. 713/176; 713/168; 705/75
(58) Field of Classification Search ............ 713/176, 713/168; 380/202, 203; 705/75; 283/13; 382/276–308
See application file for complete search history.

(56) References Cited

U.S. PATENT DOCUMENTS

| 5,646,997 | A | 7/1997 | Barton | 380/23 |
| 5,778,102 | A | 7/1998 | Sandford, II et al. | 382/251 |
| 5,822,432 | A | 10/1998 | Moskowitz et al. | 380/28 |
| 6,093,880 | A * | 7/2000 | Arnalds | 84/464 R |
| 6,208,745 | B1 * | 3/2001 | Florencio et al. | 382/100 |
| 6,209,096 | B1 * | 3/2001 | Taruguchi | 713/193 |
| 6,411,725 | B1 * | 6/2002 | Rhoads | 382/100 |
| 6,522,767 | B1 * | 2/2003 | Moskowitz et al. | 382/100 |

FOREIGN PATENT DOCUMENTS

| EP | 0766468 | 4/1997 |
| EP | 0828372 A2 | 3/1998 |
| EP | 0862318 | 9/1998 |
| WO | 9713248 | 4/1997 |
| WO | 9726733 | 7/1997 |
| WO | 9802864 | 1/1998 |

OTHER PUBLICATIONS

Wolfgang, R.B. et al. "A Watermark for Digital Images" Proceedings of the IEEE International Co Conference On Image Processing vol. 3, pp. 219-222, (1996).

Cox, I. J. et al. "A Review of Watermarking and the Importance of Perceptual Modeling" Procedings of SPIE Human Vision and Electronic Imaging,I vol. 3016, pp. 92-99, (1997).

(Continued)

*Primary Examiner*—Kambiz Zand
(74) *Attorney, Agent, or Firm*—Ladas and Parry LLP

(57) ABSTRACT

A method, an apparatus, and a computer program product for digital audio watermarking of wavetable (WT) format audio, including downloadable sounds (DLS) (110), are disclosed. Correspondingly, a method, an apparatus, and a computer program product for extracting watermarks (126, 552) from a digital audio watermarked WT audio (162, 510) are disclosed. In particular, a digital audio watermark (126) is embedded (140, 130) in both articulation parameters (122) and sample data (124) of a DLS (110). A finite automaton module (220) is used to implement adaptive coding (130) of the sample data (124). Virtual parameters (430) are generated for information hiding (140) applied to the articulation parameters (122). Optionally, playback of the WT (152) can be limited by an embedded control signal. Brief overviews of MIDI and DLS are provided.

67 Claims, 6 Drawing Sheets

OTHER PUBLICATIONS

Cox, I. J. et al. "Secure Spread Spectrum Watermarking for Multimedia", Proceedings of IEEE IEEE Trans. On Image Processing, 6 (12): 1673-1687, (1997).

Kindur D. et al., "A robust Digital Image Watermarking Method Using Wavelet-Based Fusion" Proceedings of IEEE International Conference On Image Processing vol. 1, pp. 544-547, (1997).

O'Runanaidh J. et al., "Rotation, Scale and Translation Invariant Digital Image Watermarking", Proceedings of IEEE International Conference On Image Processing, vol. 1, pp. 536-539, (1997).

Downloadable Sounds Level 1, Version 1.0, The MIDI Manufacturers Association, CA, United States of America, pp. 1,2,36-38,(1997).

* cited by examiner

METHOD AND APPARATUS FOR WATERMARKING WAVETABLE SYNTHESIS ARCHITECTURES

FIELD OF THE INVENTION

The present invention relates to the field of digital audio signal processing, and in particular to systems for watermarking digital audio signals.

BACKGROUND

The rapid development of computer networks and the increased use of multimedia data via the Internet have resulted in the exchange of digital information becoming faster and more convenient. However, the open environment of the Internet creates consequential problems regarding copyright of artistic works, and in particular the unlawful distribution of digital multimedia works without authorisation of the owners. To dissuade and perhaps eliminate illegal copying, a need exists for strengthening and assisting in the enforcement of copyright protection of such works.

Digital watermarking is a technique that has been applied to address this problem in respect of multimedia data, including audio, image and video data. Watermarking directly embeds copyright information into the original media and seeks to maintain the presence of the information in the media, even after manipulations are applied to the watermarked data. With respect to digital audio data, a watermark should be inaudible and robust against different attacks and collusion to defeat the watermarking. Furthermore, watermark detection should unambiguously identify the ownership and copyright. Still further, digital-watermarking technology is considered to be an integral part of several contributions to international standards, such as JPEG 2000 and MPEG 4.

Typically, watermarking is applied directly to data samples themselves, whether this be still image data, video frames or audio segments. However, such systems fail to address the issue of audio coding systems, where digital audio data is not available, but a form of representing the audio data for later reproduction according to a protocol is. It is well-known that tracks of digital audio data can require large amounts of storage and high data transfer rates, whereas synthesis-architecture coding protocols such as the Musical Instrument Digital Interface (MIDI) have corresponding requirements that are several orders of magnitude lower for the same audio data. MIDI audio files are not files made entirely of sampled audio data (i.e., actual audio sounds), but instead contain synthesiser instructions, or MIDI messages, to reproduce the audio data. The synthesiser instructions contain much smaller amounts of sampled audio data. That is, a synthesiser generates actual sounds from the instructions in a MIDI audio file. FIG. 7 is a block diagram of an example of a MIDI system 700 based on a personal computer 710. The computer 710 has a MIDI interface that can provide MIDI output 740 to a synthesiser 720. Alternatively, the synthesis may be performed using a sound card (not shown) installed in the computer 740, which may have a MIDI interface. In response to the MIDI instructions 740, the synthesiser produces audio output that can be provided to speakers 730, for example.

Expanding upon MIDI, Downloadable Sound (DLS) is a synthesiser-architecture specification that requires a hardware or software synthesiser to support its components. DLS permits additional instruments to be defined and downloaded to a synthesiser besides the standard 128 instruments provided by the MIDI system. The DLS file format stores both samples of digital sound data and articulation parameters to create at least one sound instrument. The articulation parameters include information about envelopes and loop points. For further information, reference is made to "Downloadable Sounds Level 1, Version 1.0", The MIDI Manufacturers Association, CA, USA, 1997. Downloadable Sound is expected to become a new standard in the musical industry, because of its specific advantages. On the one hand, when compared with MIDI, DLS provides a common playback experience and an unlimited sound palette for both instruments and sound effects. On the other hand, when compared with sampled digital audio, it has true audio interactivity and, as noted hereinbefore, smaller storage requirements.

In this connection, when compared with digital video and image watermarking techniques, digital audio watermarking techniques provide a special challenge because the human auditory system (HAS) is much more sensitive than the human visual system (HVS). An ideal watermark is inaudible and robust. By inaudibility is meant that watermark makes no difference in relation to the digital audio signal in listening tests. By robustness is meant that the watermark is difficult, and ideally impossible, to remove without destroying the host audio signal. There is, however, always a conflict between inaudibility on the one hand and robustness on the other in existing audio watermarking techniques. This is further complicated by the special circumstances created by WT audio formats such as DLS, which are not complete digital audio samples, but instead contain instructions to create audio data.

Thus, a need clearly exists for improved watermark embedding and extracting systems for WT audio formats like DLS, which also effectively address the conflict between inaudibility and robustness of watermarks.

SUMMARY

In accordance with a first aspect of the invention, there is disclosed a method of embedding a digital watermark in digital audio data coded using a synthesiser-architecture format. The method includes the step of: embedding at least a portion of the digital watermark in sample data and articulation parameters of the synthesiser-architecture format.

Preferably, the method includes the step of adaptively coding the digital watermark in the sample data. Preferably, redundancy adaptive coding is used based on a finite automaton.

Preferably, the method includes the step of hiding the digital watermark in the articulation parameters by creating virtual parameters. It may also include the step of embedding the digital watermark in the WT virtual parameters. Still further, the method may include the step of extracting one or more coded bits from watermarked sample data, the virtual instrument created dependent upon a watermarked coded bit sequence. The method may also include the step of hiding the watermarked coded bit sequence in the articulation parameters. More preferably, it includes the step of embedding the watermarked coded bit sequence in the virtual parameters. The digital watermarked coded bit sequence and/or the digital watermark may be encrypted as well.

Preferably, the method includes step of generating the digital watermark. It may also include the step of dividing the digital audio data coded using a synthesiser-architecture format into the sample data and the articulation parameters.

Optionally, the method may include the step of embedding a playback-control signal.

Preferably, the digital audio data coded using a synthesiser-architecture format is wavetable (WT) audio, and more preferably a downloadable sound (DLS).

In accordance with a second aspect of the invention, there is disclosed an apparatus for embedding a digital watermark in digital audio data coded using a synthesiser-architecture format. The apparatus includes: a device for embedding at least a portion of the digital watermark in sample data of the synthesiser-architecture format; and a device for embedding at least a portion of the digital watermark in articulation parameters of the synthesiser-architecture format.

In accordance with a third aspect of the invention, there is disclosed a computer program product having a computer readable medium having a computer program recorded therein for embedding a digital watermark in digital audio data coded using a synthesiser-architecture format. The computer program product includes: a module for embedding at least a portion of the digital watermark in sample data of the synthesiser-architecture format; and a module for embedding at least a portion of the digital watermark in articulation parameters of the synthesiser-architecture format.

In accordance with a fourth aspect of the invention, there is disclosed a method of extracting a digital watermark from watermarked digital audio data coded using a synthesiser-architecture format. The method includes the steps of: detecting a watermark from articulation parameters of the watermarked digital audio data coded using a synthesiser-architecture format; detecting a watermark from sample data of the watermarked digital audio data coded using a synthesiser-architecture format; and verifying the watermark by comparing the detected watermarks.

Preferably, the method includes the step of replacing the watermark from the sample data with a corresponding watermark embedded in the articulation parameters if the watermark from the sample data is not available or has been modified. The watermark from the sample data preferably includes an adaptively coded bit sequence. The method may include the step of decrypting the adaptively coded bit sequence and/or the digital watermark.

Preferably, the method includes the step of dividing the watermarked digital audio data coded using a synthesiser-architecture format into the sample data and the articulation parameters.

Optionally, the method includes the step of extracting a playback-control signal.

More preferably, the digital audio data coded using a synthesiser-architecture format is wavetable (WT) audio and more preferably, a downloadable sound (DLS).

In accordance with a fifth aspect of the invention, there is disclosed an apparatus for extracting a digital watermark from watermarked digital audio data coded using a synthesiser-architecture format. The apparatus includes: a device for detecting a watermark from articulation parameters of the watermarked digital audio data coded using a synthesiser-architecture format; a device for detecting a watermark from sample data of the watermarked digital audio data coded using a synthesiser-architecture format; and a device for verifying the watermark by comparing the detected watermarks.

In accordance with a sixth aspect of the invention, there is disclosed a computer program product for extracting a digital watermark from watermarked digital audio data coded using a synthesiser-architecture format. The computer program product includes: a module for detecting a watermark from articulation parameters of the watermarked digital audio data coded using a synthesiser-architecture format; a module for detecting a watermark from sample data of the watermarked digital audio data coded using a synthesiser-architecture format; and a module for verifying the watermark by comparing the detected watermarks.

In accordance with a seventh aspect of the invention, there is disclosed a system for watermarking a wavetable (WT) audio file, and more particularly a DLS file. The system includes: a module for embedding watermark data into a WT file; and a module for extracting the watermark data from the embedded WT file.

In accordance with an eighth aspect of the invention, there is disclosed a method of playing a watermarked WT file having a control signal embedded therein to control the number of playbacks. The method includes the steps of: automatically checking the watermarked WT signal for the control signal to ensure authentication; if the control signal indicates at least one playback remains, playing the watermarked WT file; and decrementing the control signal.

BRIEF DESCRIPTION OF THE DRAWINGS

A small number of embodiments of the invention are described hereinafter with reference to the drawings, in which.

DETAILED DESCRIPTION

A method, an apparatus, and a computer program product for digital audio watermarking of wavetable (WT) format audio, including downloadable sounds, are described hereinafter. Correspondingly, a method, an apparatus, and a computer program product for extracting digital audio watermarks from watermarked WT format audio are also described. In the following description, numerous specific details are set forth including content addressing techniques. It will be apparent to one skilled in the art, however, that the present invention may be practised without these specific details. In other instances, well-known features are not described in detail so as not to obscure the present invention.

The watermark embedding and extracting systems according to the embodiments of the invention are advantageous in that a watermark is inaudible within its host signal and difficult or impossible to remove by unauthorised access. Further, the watermark can be easily extracted by an authorised person such as the owner of the copyright in the audio work, and it is robust against incidental and intentional distortions.

In the following description, components of the system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

System for Embedding Watermarks in WT Audio

Figure 1:
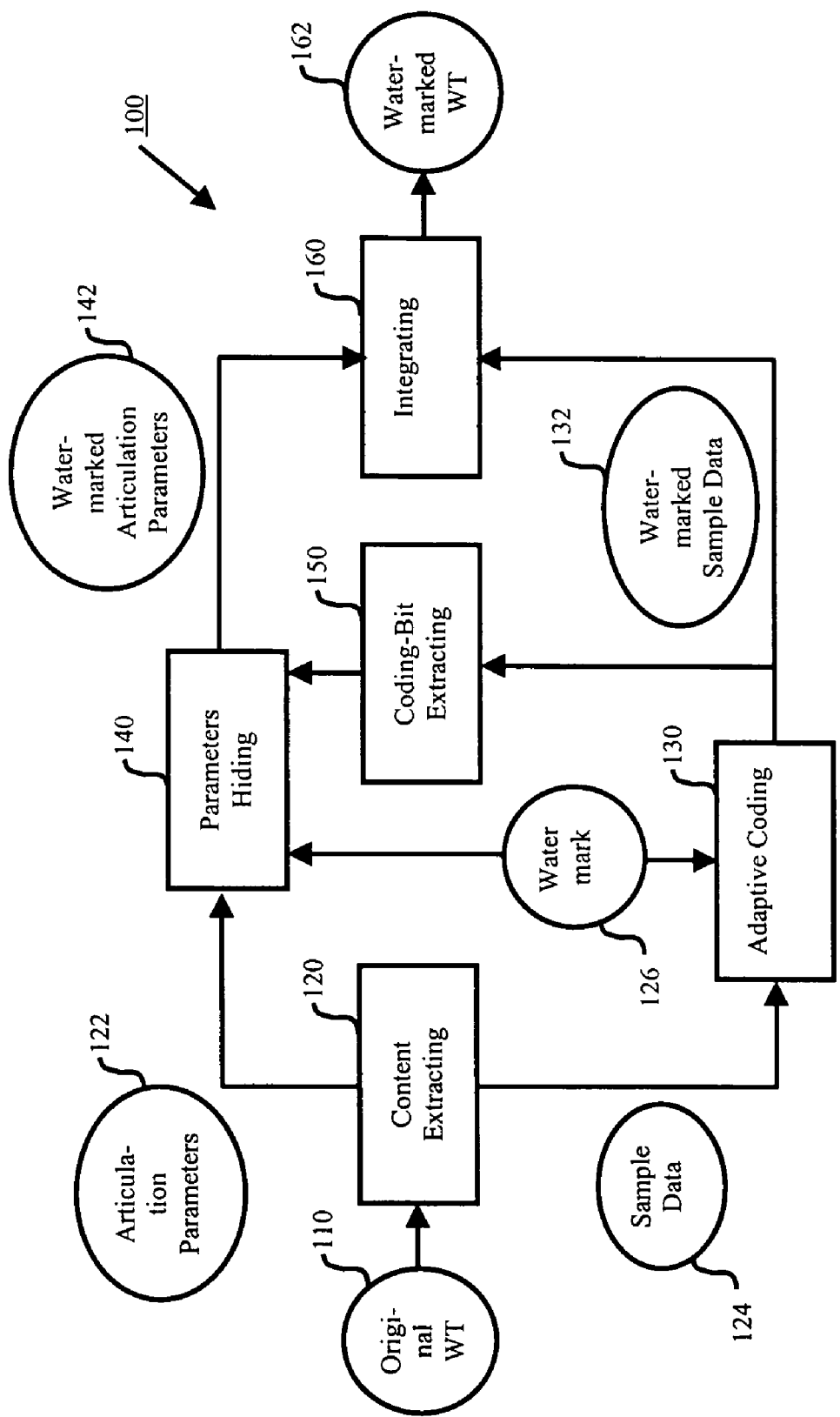
FIG. 1 is a block diagram of a system for embedding digital audio watermarks in wavetable audio (WT) in accordance with a first embodiment of the invention.

FIG. 1 is a block diagram of a system for embedding a watermark 126 in an original WT audio file 110. Again, a WT audio file contains two parts: articulation parameters and sample data, or only contains articulation parameters such as MIDI. Unlike traditional sampled digital audio, the sample data in a WT audio file are not the prevalent components. To the contrary, the WT articulation parameters control how sounds are played or reproduced.

An original WT audio 110 is input to a content-extracting module 120, which produces articulation parameters 122 and sample data 124 as its output. That is, the original WT audio 110 is divided into sample-data and articulation-parameter components 124 and 122. The articulation parameters 122 are input to a parameters hiding module 140, and the sample data 124 are input to an adaptive-bit coding module 130. A watermark 126 is also input to both the parameters hiding and adaptive-bit coding modules 140, 130. Thus, not only is a watermark 126 embedded into the sample data 124, but it is also embedded into the articulation parameters 122. Two different embedding modules 130, 140 process them 122, 124, respectively, and form relevant watermarked outputs 142, 132.

Figure 2:
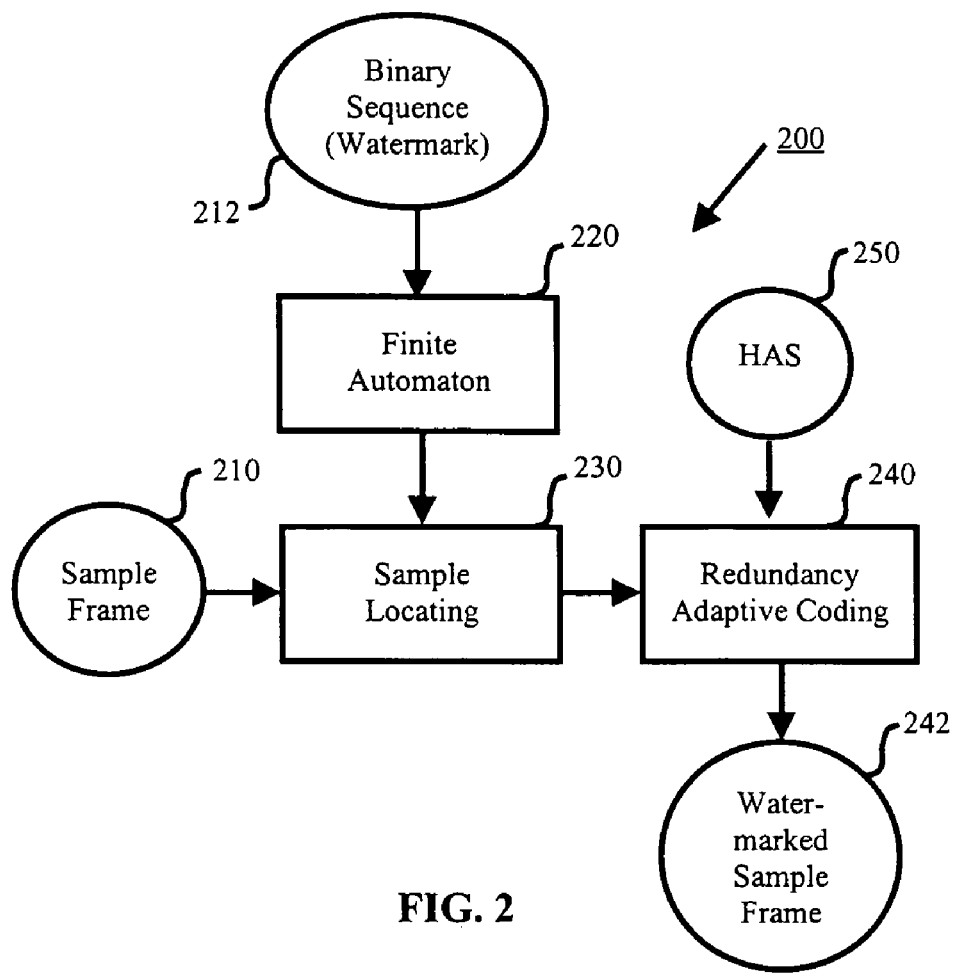
FIG. 2 is a detailed block diagram of an adaptive-bit coding module 130 implemented in the watermark embedding system of FIG. 1.

The adaptive-bit coding module 130 is based on a finite automaton and is depicted in greater detail in FIG. 2. The adaptive-bit coding module 130 produces watermarked sample data 132 at its output. Basically, this module 130 embeds the watermark 212 (126) into the audio sample data 124 by replacing bits of the sample points with bits of a binary sequence of the watermark 212. This is described in greater detail hereinafter with reference to FIGS. 2 and 3.

The watermarked sample data 132 is provided as input to both a coding-bit extracting module 150 and an integrating module 160. This module 150 extracts the coded-bit sequence of the watermarked sample data 132. The output of the coding-bit extracting module 150 is input to the parameters-hiding module 140, as well. As described hereinafter in greater detail with reference to FIG. 4, the parameters-hiding module 140 embeds the watermark 140, and if necessary the watermarked coded-bit sequence of the watermarked sample data 132, into the articulation parameters 122. The watermarked articulation parameters 142 are input to the integrating module 160, along with the watermarked sample data 132. The integrating module 160 produces a watermarked WT audio 162 as the output of the embedding system 100 by integrating the watermarked sample data 132 and the articulation parameters 142. The integrating module 160 repackages the watermarked articulation parameters 142 and watermarked sample data 132 in standard WT audio form.

Adaptive-Bit Coding Module 200

FIG. 2 is a block diagram illustrating in greater detail the adaptive-bit coding module 200 (i.e., 130 in FIG. 1). Bits of the sample data are also coded according to the HAS, so as to ensure minimal distortion of original sample data. The watermark 212 is processed as a string of binary sequences. Each bit of the sequence 212 replaces a corresponding bit of the sample points 210. The particular location in the sample point is determined by the finite automation (FA) module 220 and the HAS. The locations are determined by the sample locating module 230. The number of sample points is determined by the redundancy adaptive coding module 240, dependent on the HAS 250.

As shown in FIG. 2, the output of the finite automaton module 220 and a sample frame 210 (124) of WT audio data are input to the sample-locating module 230. The output of the sample-locating module 230 is input to a redundancy adaptive coding module 240, which also receives input based on the HAS 250. The redundancy adaptive coding module 240 produces the watermarked sample frame 242 as the output of the adaptive coding module 200 (130).

Adaptive-bit coding has, however, low immunity to manipulations. Embedded information can be destroyed by channel noise, re-sampling, and other operations. Adaptive-bit coding technique is used based on several considerations. Firstly, unlike sampled digital audio, WT audio is a parameterised digital audio, so it is difficult to attack using typical signal processing techniques, such as adding noise and re-sampling. Secondly, the size of a wave sample 210 in WT audio is small, and therefore it is unsuitable to embed a watermark in the sample in the frequency domain. Thirdly, to ensure robustness, the watermarked bit sequence of sample data is embedded into the articulation parameters 122 of WT audio. If the sample data are distorted, the embedded information can be used to restore the coded bits of the sample data 124.

The operation or functionality of a finite automaton M implemented by the module 220 can be described as a quintuple:

$$M = <X, Y, S, \delta, \lambda>, \tag{1}$$

where X is a non-empty finite set (the input alphabet of M), Y is a non-empty finite set (the output alphabet of M), S is a non-empty finite set (the state alphabet of M), $\delta$: S×X→S is a single-valued mapping (the next state function of M) and $\lambda$: S×X→S is a single-valued mapping (the output function of M).

The elements X, Y, S, $\delta$, and $\lambda$ are expressed as follows:

$$X = \{0, 1\}, \tag{2}$$

$$Y = \{y_1, y_2, y_3, y_4\}, \tag{3}$$

$$S = \{S_0, S_1, S_2, S_3, S_4\}, \tag{4}$$

$$S_{i+1} = \delta\{S_i, x\}, \text{ and} \tag{5}$$

$$y_i = \lambda\{S_i, x\}, \tag{6}$$

where $y_i$ (i=1,2,3,4) is the number of sample points that are jumped off when embedding bit corresponding to relevant states, x is the element of X and has a value of 0 or 1, $S_i$(i=0–4) is five types of states corresponding to 0, 00, 01, 10 and 11, respectively, and $S_0$ is the initial state.

Figure 3:
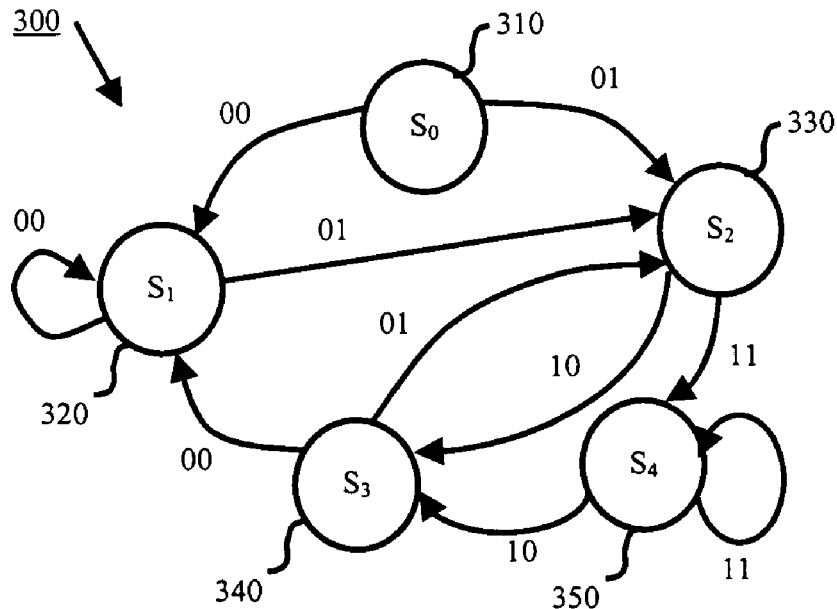
FIG. 3 is a state diagram of a finite automaton module 220 implemented in the adaptive-bit coding module 220 of FIG. 2.

The state transfer diagram 300 of the finite automaton of the module 220 is depicted in FIG. 3. Each state transition is indicated with a single-headed arrow with an input extending from the current state to the next state. The initial state $S_0$ 310 makes a transition to either state $S_1$ 320 for input 00 or to state $S_2$ 330 for 01. The state $S_1$ 320 makes a transition to itself for 00 or to state $S_{2330}$ for 01. The state $S_{2320}$ makes a transition to state $S_{3340}$ for 10 or to state $S_{4350}$ for 11. The state $S_{3340}$ makes a transition to state $S_2$ 330 for 01 or to state $S_1$ 320 for 00. The state $S_4$ 350 makes a transition to itself for 11 or to state $S_3$ 340 for 10.

Appendix A contains an example of adaptive coding using low-bit data hiding to embed a watermark into WT sample data.

Parameters-Hiding Module 400

Figure 4:
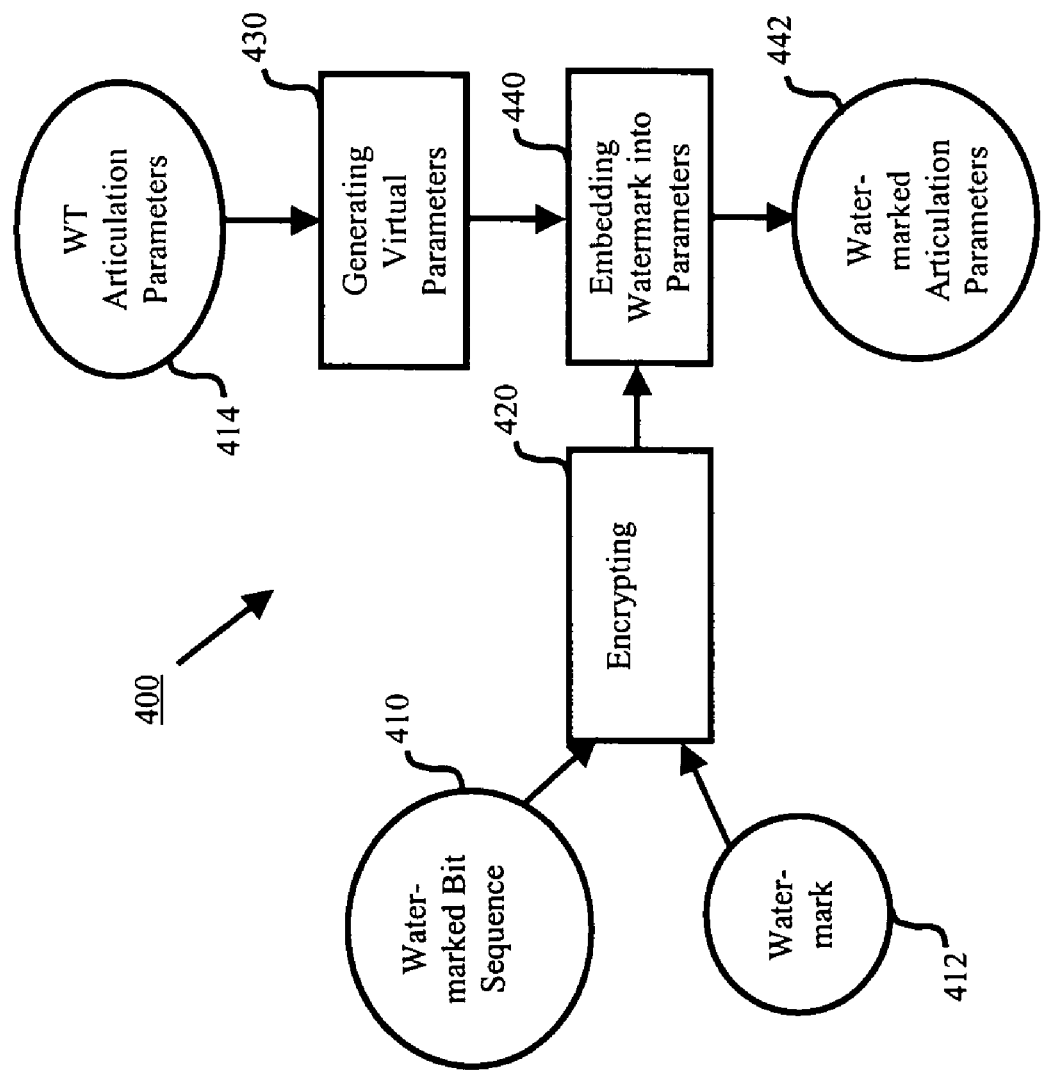
FIG. 4 is a detailed block diagram of a parameters hiding module 140 implemented in the watermark embedding system of FIG. 1.

FIG. 4 is a block diagram illustrating in greater detail the parameters-hiding module 400 (i.e., 140 of FIG. 1). In particular, to ensure the robustness of the watermarked WT audio 162, the parameters-hiding module 400 embeds the watermark 412 (126), and if necessary the watermarked bit sequence 410, into the WT articulation parameters (414, 122). The watermark 412 and watermarked bit sequence 410 are input to an encrypting module 420, which encrypts them and forms a data stream. Preferably, DES encryption is implemented by the module 420. However, numerous other encryption techniques, including Advanced Encryption Standard (AES) such as LOK197, Twofish and Serpent, can be practised instead without departing from the scope and spirit of the invention.

The WT articulation parameters 414 are input to a module 430 for generating WT virtual parameters. The virtual parameters are used to embed the watermarked data stream into the WT articulation parameters. The virtual parameters are generated by the module 430 from the WT articulation parameters 414. The output module 430 is provided to a module 440 for embedding the watermark into the articulation parameters 414 to produce watermarked articulation parameters 442 dependent on the watermarked coded bit sequence 410 and the watermark 412, which are preferably encrypted by encrypting module 420 before being input to the module 440. Because attackers do not know the location of the virtual parameters, the embedded data are difficult to detect and remove in the presence of attacks. On the other hand, embedding both the watermark 412 and the watermarked bit sequence 410 into the articulation parameters 414 ensures the correction of detected distortions of watermarks in the WT sample data 124.

Appendix B contains an example of parameters hiding by generating virtual parameters.

The watermark embedding system 100 of FIGS. 1 to 4 advantageously provides a watermark that is inaudible within its host WT signal and difficult or impossible to remove by unauthorised access. Further, an authorised person can easily extract the watermark. Still further, it is robust against incidental and intentional distortions.

System for Extracting Watermarks from Watermarked WT

Figure 5:
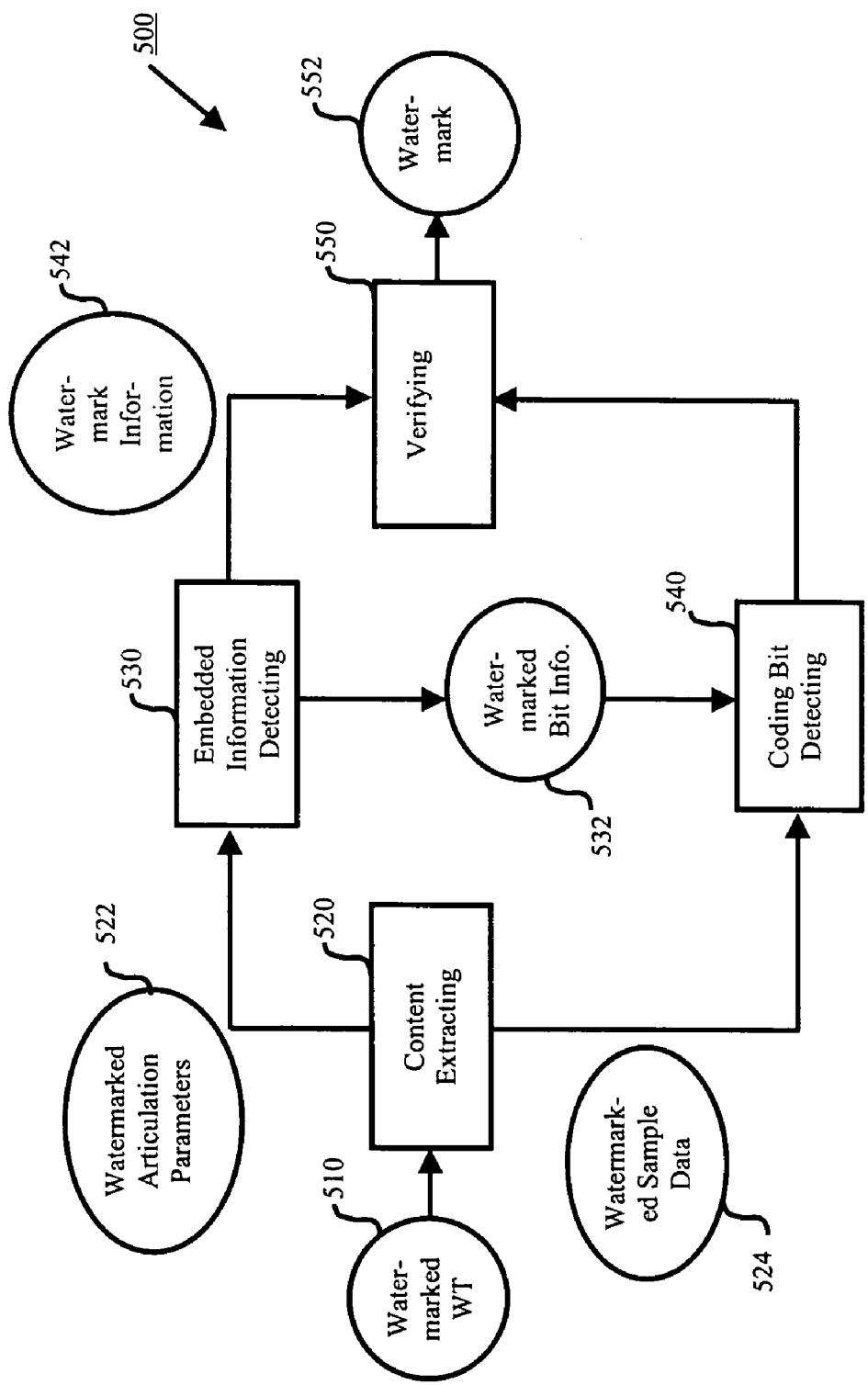
FIG. 5 is a block diagram of a system for extracting digital audio watermarks from watermarked WT audio in accordance with a second embodiment of the invention.

FIG. 5 is a block diagram of a corresponding system 500 for extracting a watermark 500 from watermarked WT audio 510 in accordance with a second embodiment. This system 500 performs substantially the inverse operation of the embedding system 100. In the extraction process implemented by the system 500, the original WT audio is not needed.

The watermarked WT audio 510 is input to a content-extracting module 520, which produces watermarked articulation parameters 522 and watermarked sample data 524 as its output. This module 520 implements the inverse operations of the integrating module 160. That is, the watermarked WT audio 510 is divided into its component parts, sample data 524 and articulation parameters 522. The watermarked sample data 524 are provided to a coding-bit detecting module 540, and the watermarked articulation parameters 522 are provided to a module for detecting embedded information 530. The detecting module 530 produces watermarked coded bit information 532 and watermark information 542 at its output to the coding-bit detecting and verifying modules 540 and 550, respectively. The detecting module 530 performs the inverse operations of the parameters-hiding module 140. It finds the virtual parameters, decrypts the virtual parameters and extracts the watermark and watermarked coded bits of WT sample data. The code-bit detecting module 540 performs the inverse operations of module 130. It locates the positions of coding bits based on the finite automaton, determines the value of the bits corresponding to binary watermark sequence based on the redundancy technique and the HAS, and recovers the watermark.

The encrypted watermark information in the virtual parameters of the articulation parameters is detected, as is the watermark sequence in the coding-bits of the sample data. The coding-bit detecting module detects the coding-bits of the watermarked sample data 524, if available, which is provided as input to the verifying module 550 as well. The verifying module 550 compares the watermark sequence in the sample data 524 with the watermark information 542 in the articulation parameters to verify the watermark. If the watermarked sample data 524 has suffered distortions and the watermark sequence cannot be detected by the module 540, the watermarked coding-bit sequence 532 is used to restore the coding-bit information in the sample data 524 and make the detection in the restored data. Similarly, the verifying module 552 verifies the detected watermark by comparing the output of the module 540 with the information 542 embedded in the articulation parameters 522.

Authorisation of Playback

Optionally, the embedding system 100 embeds an information flag to control the number of times that an authorised user can playback the WT audio. That is, for an authorised user, the WT audio can be played a fixed number of times determined by the WT audio owner. Detection of the number of repeat times is built into the play tools. When the WT audio is about to be played, the control information is first detected. After each use, the remaining number of times to be played decrements. If it reaches to zero, the particular WT audio cannot be played back. Embedding and detecting the control information is carried out by the same modules used to embed and detect watermarks in the articulation parameters, i.e. another virtual instrument is generated for the control signal.

The foregoing embodiments of the invention are advantageous in that watermark information can be inaudibly embedded in WT audio and robustly detected and extracted. Preferably, the embodiments of the invention can be implemented using a computer system, such as the general-purpose computer shown in FIG. 6. In particular, the systems of FIGS. 1 and 5 can be implemented as software, or a computer program, executing on the computer. The method or process steps for embedding and extracting watermarks to and from a WT audio are effected by instructions in the software that are carried out by the computer. Again, the software may be implemented as one or more modules for implementing the process steps. That is, a module is a part of a computer program that usually performs a particular function or related functions.

In particular, the software may be stored in a computer readable medium, including the storage devices described hereinafter. The software is loaded into the computer from the computer readable medium and then the computer carries out its operations. A computer program product includes a computer readable medium having such software or a computer program recorded on it that can be carried out by a computer. The use of the computer program product in the computer preferably effects advantageous apparatuses for embedding and extracting watermarks to and from a WT audio in accordance with the embodiments of the invention.

The computer system 600 includes the computer 602, a video display 616, and input devices 618, 620. In addition, the computer system 600 can have any of a number of other output devices including line printers, laser printers, plotters, and other reproduction devices connected to the computer 602. The computer system 600 can be connected to one or more other computers via a communication interface 608A using an appropriate communication channel 630 such as a modem communications path, an electronic network, or the like. The network may include a local area network (LAN), a wide area network (WAN), an Intranet, and/or the Internet.

Figure 6:
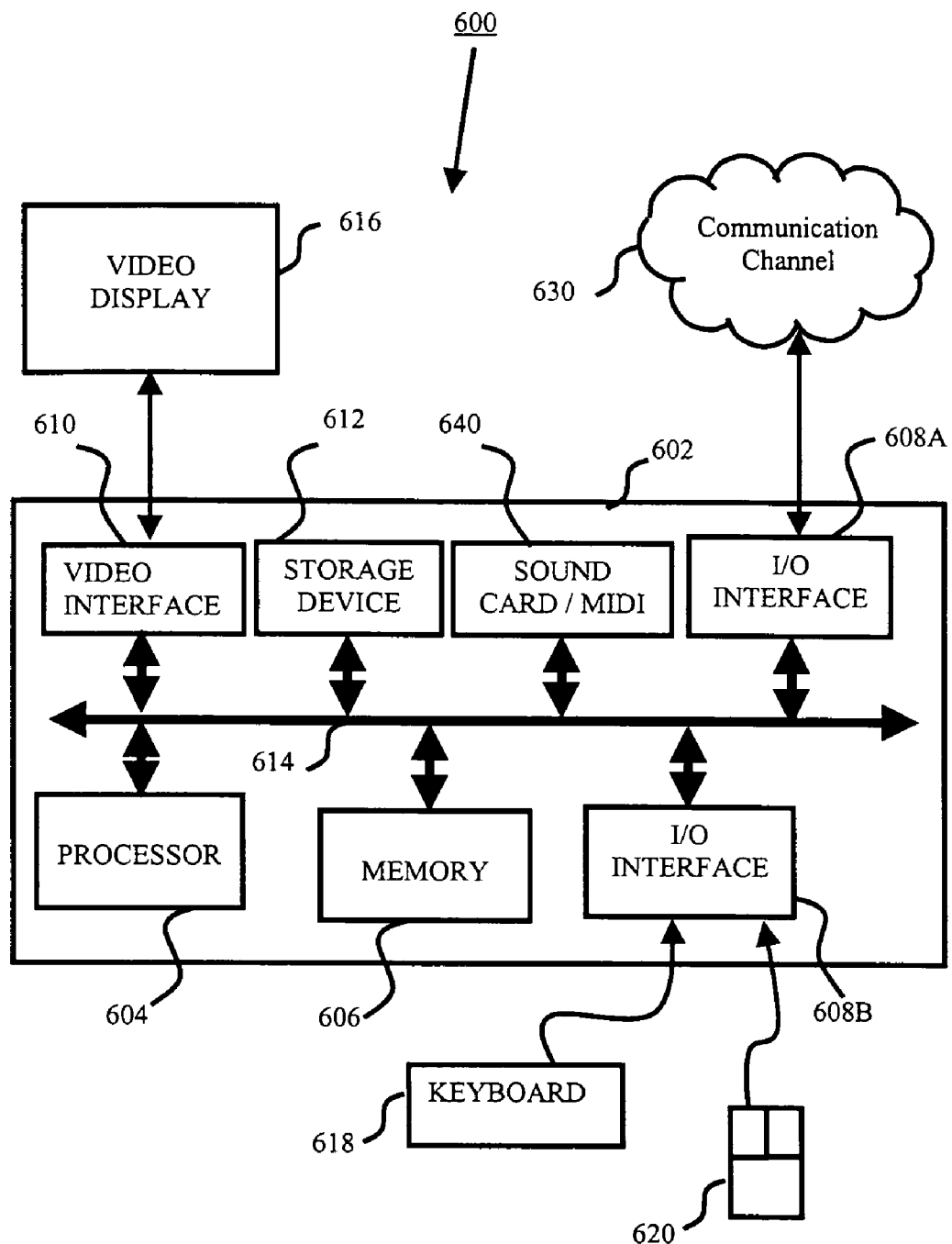
FIG. 6 is a block diagram of an example of a computer system, with which the embodiments can be practised.
Figure 7:
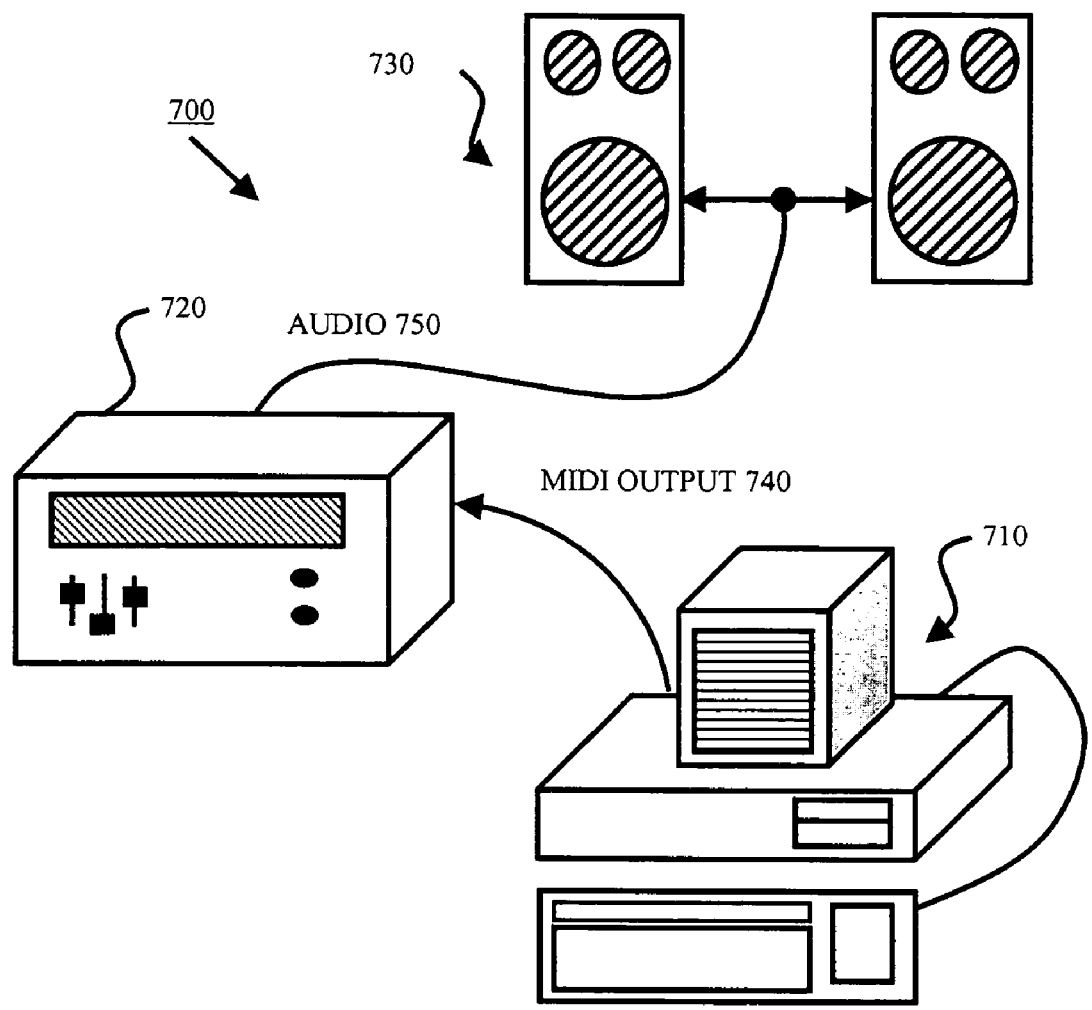
FIG. 7 is a block diagram of a conventional MIDI system based on a personal computer.

The computer 602 includes: a central processing unit(s) (simply referred to as a processor hereinafter) 604, a memory 606 that may include random access memory (RAM) and read-only memory (ROM), input/output (IO) interfaces 608A and 608B, a video interface 610, and one or more storage devices generally represented by a block 612 in FIG. 6. The storage device(s) 612 can consist of one or more of the following: a floppy disc, a hard disc drive, a magneto-optical disc drive, CD-ROM, magnetic tape or any other of a number of non-volatile storage devices well known to those skilled in the art.

Preferably, the system 600 also includes a MIDI interface 640, which can connect to an external synthesiser (not shown). More preferably, the system 600 can include a sound card 640, which may also implement the MIDI interface. The sound card 640 can capture and/or reproduce audio signals and may incorporate a built-in synthesiser (e.g. a wavetable synthesiser).

Each of the components 604 to 612 and 640 is typically connected to one or more of the other devices via a bus 614 that in turn can consist of data, address, and control buses. Numerous other devices can be employed as part of the computer system 600 including a video capture card, for example. The video interface 610 is connected to the video display 616 and provides video signals from the computer 602 for display on the video display 616. User input to operate the computer 602 can be provided by one or more input devices via the interface 608B. For example, an operator can use the keyboard 618 and/or a pointing device such as the mouse 620 to provide input to the computer 602.

The system 600 is simply provided for illustrative purposes and other configurations can be employed without departing from the scope and spirit of the invention. Computers with which the embodiment can be practised include IBM-PC/ATs or compatibles, one of the Macintosh (™) family of PCs, Sun Sparcstation (™), a workstation or the like. Many such computers use graphical operating systems such as Microsoft Windows 95 and 98, for example. The foregoing is merely exemplary of the types of computers with which the embodiments of the invention may be practised. Typically, the processes of the embodiments are resident as software or a program recorded on a hard disk drive (generally depicted as block 612 in FIG. 6) as the computer readable medium, and read and controlled using the processor 604. Intermediate storage of the program and any data fetched from the network may be accomplished using the semiconductor memory 606, possibly in concert with the hard disk drive 612.

In some instances, the program may be supplied to the user encoded on a CD-ROM or a floppy disk (both generally depicted by block 612), or alternatively could be read by the user from the network via a modem device connected to the computer, for example. Still further, the computer system 600 can load the software from other computer readable medium. This may include magnetic tape, a ROM or integrated circuit, a magneto-optical disk, a radio or infra-red transmission channel between the computer and another device, a computer readable card such as a PCMCIA card, and the Internet and Intranets including email transmissions and information recorded on web sites and the like. The foregoing is merely exemplary of relevant computer readable mediums. Other computer readable mediums may be practised without departing from the scope and spirit of the invention.

A system for embedding watermark data into a WT audio file; and extracting watermark data from an embedding WT audio file is referred to KentMark (WT).

In the foregoing manner, a method, an apparatus, and a computer program product for digital audio watermarking of wavetable (WT) audio are disclosed. Correspondingly, a method, an apparatus, and a computer program product for extracting digital audio watermarks from watermarked WT audio are disclosed. While only a small number of embodiments are described, it will be apparent to those skilled in the art in view of this disclosure that numerous changes and/or modifications can be made without departing from the scope and spirit of the invention.

Appendix A

Redundancy Low-Bit Coding Based on FA and HAS

The basic idea in low-bit coding is to embed a watermark into an audio signal by replacing the least significant bit of each sampling point by a coded binary string corresponding to the watermark. For example, in a 16-bits per sample representation, the least four bits can be used for hiding the watermark. The hidden data detection in low-bit coding is done by reading out the value from the low bits. The stego key is the position of the altered bits. Low-bit coding a simple way to embed data into digital audio and can be applied in all ranges of transmission rates with digital communication modes. Preferably, the channel capacity can be 8 kbps in an 8 kHz sampled sequence and 44 kps in a 44 kHs sampled sequence for a noiseless channel application.

An example procedure of redundancy low-bit coding method based on a finite automation (FA) and HAS is:

(1) Convert the watermark message into a binary sequence;
(2) Determine the values of the elements in the FA, that is, the number of sample points that are jumped off corresponding relevant states:

$y_1$: state 00
   $y_2$: state 01
   $y_3$: state 10
   $y_4$: state 11

(3) Determine the redundant number for 0 and 1 bit to be embedded:

$r_o$: the embedded number for 0 bit; and
   $r_i$: the embedded number for 1 bit.

(4) Determine the HAS threshold T;
(5) For each bit of the binary sequence corresponding to watermark message and the sample point in the WT sample data:
  (a) Compare the amplitude value A of the sample point with the HAS threshold T, if A<T then goto next point, else
  (b) Step over $y_i(i=1,2,3,4,)$ number of points and replace the lowest bit of $r_j(j=0,1)$ number of points by the bit of the binary sequence;
  (c) Repeat until all bits in binary sequence are processed.

Appendix B

The basic idea in parameters hiding is to embed the watermark information into the articulation parameters of WT audio by generating virtual parameters. To illustrate this, Downloadable Sounds (DLS) Level 1 are considered as the WT audio to show how to hide watermark information in the articulation parameters.

The following steps are performed:
(1) Encrypt the watermark binary sequence and watermarked low-bits sequence;
(2) Segment the encrypted data stream into n parts;
(3) Create a virtual instrument in the DLS file, and use its parameters to hide the watermark information.

The virtual instrument collection to hide watermark information can be described as follows:

```
LIST 'ins'
    LIST 'INFO'
        Inam "Instrument name"
        <dlid> (watermark Info part 1)
        <insh> (watermark Info part 2)
    LIST 'lrgn'
        LIST 'rgn'
            <rgnh> (watermark Info part 3)
            <wsmp> (watermark Info part 4)
            <wlnk> (watermark Info part 5)
        LIST 'rgn'
            .
            .
            .
        . . .
    LIST 'lart'
        <art1> (watermark Info part n)
```

What is claimed is:

1. A method of embedding a digital watermark in digital audio data coded using a synthesiser-architecture format, said method including the steps of:
  embedding a digital watermark in sample data of said digital audio data coded using a synthesiser-architecture format, and
  embedding a digital watermark in articulation parameters of said digital audio data coded using a synthesiser-architecture format;
  wherein said embedded digital watermarks in said sample data and said articulation parameters respectively are chosen to enable verification of said watermarks by comparing said watermarks to determine if said watermark from said sample data is not available or has been modified.

2. The method according to claim 1, further including the step of adaptively coding said digital watermark in said sample data.

3. The method according to claim 2, wherein adaptively coding said digital watermark in said sample data comprises using redundancy adaptive coding based on a finite automaton.

4. The method according to claim 1, further including the step of hiding said digital watermark in said articulation parameters by creating virtual parameters.

5. The method according to claim 4, further including the step of embedding said digital watermark in said virtual parameters.

6. The method according to claim 4, further including the step of extracting one or more coded bits from watermarked sample data, said virtual parameters created dependent upon a watermarked coded bit sequence.

7. The method according to claim 6, further including the step of embedding said watermarked coded bit sequence in said virtual parameters.

8. The method according to claim 6, further including the step of encrypting said digital watermarked coded bit sequence.

9. The method according to claim 4, further including the step of encrypting said digital watermark.

10. The method according to claim 1, further including the step of generating said digital watermark.

11. The method according to claim 1, further including the step of dividing said digital audio data coded using a synthesiser-architecture format into said sample data and said articulation parameters.

12. The method according to claim 1, further including the step of embedding a playback-control signal.

13. The method according to claim 1, wherein said digital audio data coded using a synthesiser-architecture format is wavetable (WT) audio.

14. The method according to claim 2, wherein the step of adaptively coding said digital watermark in said sample data comprises selecting the position in the sample data in which to embed the watermark.

15. The method according to claim 2, wherein the step of adaptively coding said digital watermark in said sample data is based only on the sample data and the digital watermark to be encoded.

16. An apparatus for embedding a digital watermark in digital audio data coded using a synthesiser-architecture format, said apparatus including:
  means for embedding a digital watermark in sample data of said digital audio data coded using a synthesiser-architecture format, and
  means for embedding a digital watermark in articulation parameters of said digital audio data coded using a synthesiser-architecture format;
  wherein said embedded digital watermarks in said sample data and said articulation parameters respectively are chosen to enable verification of said watermarks by comparing said watermarks to determine if said watermark from said sample data is not available or has been modified.

17. The apparatus according to claim 16, further including means for adaptively coding said digital watermark in said sample data.

18. The apparatus according to claim 17, wherein said means for adaptively coding said digital watermark in said sample data uses redundancy adaptive coding based on a finite automaton.

19. The apparatus according to claim 16, further including means for hiding said digital watermark in said articulation parameters by creating virtual parameters.

20. The apparatus according to claim 19, further including means for embedding said digital watermark in said virtual parameters.

21. The apparatus according to claim 19, further including means for extracting one or more coded bits from watermarked sample data, said virtual parameters created dependent upon a watermarked coded bit sequence.

22. The apparatus according to claim 21, further including means for embedding said watermarked coded bit sequence in said virtual parameters.

23. The apparatus according to claim 21, further including means for encrypting said digital watermarked coded bit sequence.

24. The apparatus according to claim 19, further including means for encrypting said digital watermark.

25. The apparatus according to claim 16, further including means for generating said digital watermark.

26. The apparatus according to claim 16, further including means for dividing said digital audio data coded using a synthesiser-architecture format into said sample data and said articulation parameters.

27. The apparatus according to claim 16, further including means for embedding a playback-control signal.

28. The apparatus according to claim 16, wherein said digital audio data coded using a synthesiser-architecture format is wavetable (WT) audio.

29. The apparatus according to claim 16 for watermarking a wavetable (WT) audio file, wherein watermark data embedded into sample data and articulation parameters of a WT file.

30. The apparatus according to claim 17, wherein the means for adaptively coding said digital watermark in said sample data is operable to select the position in the sample data in which to embed the watermark.

31. The apparatus according to claim 17, wherein the means for adaptively coding said digital watermark in said sample data is operable to encode the digital watermark based only on the sample data and the digital watermark.

32. A computer program product having a computer readable medium having a computer program recorded therein for embedding a digital watermark in digital audio data coded using a synthesiser-architecture format, said computer program product including:
   means for embedding a digital watermark in sample data of said digital audio data coded using a synthesiser-architecture format; and
   means for embedding a digital watermark in articulation parameters of said digital audio data coded using a synthesiser-architecture format;
   wherein said embedded digital watermarks in said sample data and said articulation parameters respectively are chosen to enable verification of said watermarks by comparing said watermarks to determine if said watermark from said sample data is not available or has been modified.

33. The computer program product according to claim 32, further
   including means for adaptive coding said digital watermark in said sample data.

34. The computer program product according to claim 33, wherein said means for adaptive coding said digital watermark in said sample data uses redundancy adaptive coding based on a finite automaton.

35. The computer program product according to claim 32, further including means for hiding said digital watermark in said articulation parameters by creating virtual parameters.

36. The computer program product according to claim 35, further including means for embedding said digital watermark in said virtual parameters.

37. The computer program product according to claim 35, further including means for extracting one or more coded bits from watermarked sample data, said virtual parameters created dependent upon a watermarked coded bit sequence.

38. The computer program product according to claim 37, further including means for embedding said watermarked coded bit sequence in said virtual parameters.

39. The computer program product according to claim 37, further including means for encrypting said digital watermarked coded bit sequence.

40. The computer program product according to claim 35, further including means for encrypting said digital watermark.

41. The computer program product according to claim 32, further including means for generating said digital watermark.

42. The computer program product according to claim 32, further including means for dividing said digital audio data coded using a synthesiser-architecture format into said sample data and said articulation parameters.

43. The computer program product according to claim 32, further including means for embedding a playback-control signal.

44. The computer program product according to claim 32, wherein said digital audio data coded using a synthesiser-architecture format is wavetable (WT) audio.

45. The computer program product according to claim 33, wherein the means for adaptive coding said digital watermark in said sample data is operable to select the position in the sample data in which to embed the watermark.

46. The computer program product according to claim 33, wherein the means for adaptive coding said digital watermark in said sample data is operable to encode the digital watermark based only on the sample data and the digital watermark.

47. A method of extracting a digital watermark from watermarked digital audio data coded using a synthesiser-architecture format, said method including the steps of:
   detecting a watermark from articulation parameters of said watermarked digital audio data coded using a synthesiser-architecture format;
   detecting a watermark from sample data of said watermarked digital audio data coded using a synthesiser-architecture format;
   verifying said watermark by comparing said detected watermarks; and
   replacing the watermark from said sample data with a corresponding watermark embedded in said articulation parameters if said watermark from said sample data is not available or has been modified.

48. The method according to claim 47, wherein said watermark from sample data includes an adaptively coded bit sequence.

49. The method according to claim 48, further including the step of decrypting said adaptively coded bit sequence.

50. The method according to claim 47, further including the step of decrypting said digital watermark.

51. The method according to claim 47, further including the step of dividing said watermarked digital audio data coded using a synthesiser-architecture format into said sample data and said articulation parameters.

52. The method according to claim 47, further including the step of extracting a playback-control signal.

53. The method according to claim 47, wherein said digital audio data coded using a synthesiser-architecture is wavetable (WT) audio.

54. An apparatus for extracting a digital watermark from watermarked digital audio data coded using a synthesiser-architecture format, said apparatus including:
- means for detecting a watermark from articulation parameters of said watermarked digital audio data coded using a synthesiser-architecture format;
- means for detecting a watermark from sample data of said watermarked digital audio data coded using a synthesiser-architecture format;
- means for verifying said watermark by comparing said detected watermarks; and
- means for replacing the watermark from said sample data with a corresponding watermark embedded in said articulation parameters if said watermark from said sample data is not available or has been modified.

55. The apparatus according to claim 54, wherein said watermark from sample data includes an adaptively coded bit sequence.

56. The apparatus according to claim 55, further including means for decrypting said adaptively coded bit sequence.

57. The apparatus according to claim 54, further including means for decrypting said digital watermark.

58. The apparatus according to claim 54, further including means for dividing said watermarked digital audio data coded using a synthesiser-architecture format into said sample data and said articulation parameters.

59. The apparatus according to claim 54, further including means for extracting a playback-control signal.

60. The apparatus according to claim 54, wherein said digital audio data coded using a synthesiser-architecture format is wavetable (WT) audio.

61. A computer program product for extracting a digital watermark from watermarked digital audio data coded using a synthesiser-architecture format, said computer program product including:
- means for detecting a watermark from articulation parameters of said watermarked digital audio data coded using a synthesiser-architecture format;
- means for detecting a watermark from sample data of said watermarked digital audio data coded using a synthesiser-architecture format;
- means for verifying said watermark by comparing said detected watermarks; and
- means for replacing the watermark from said sample data with a corresponding watermark embedded in said articulation parameters if said watermark from said sample data is not available or has been modified.

62. The computer program product according to claim 61, wherein said watermark from sample data includes an adaptively coded bit sequence.

63. The computer program product according to claim 62, further including means for decrypting said adaptively coded bit sequence.

64. The computer program product according to claim 61, further including means for decrypting said digital watermark.

65. The computer program product according to claim 61, further including means for dividing said watermarked digital audio data coded using a synthesiser-architecture format into said sample data and said articulation parameters.

66. The computer program product according to claim 61, further including means for extracting a playback-control signal.

67. The computer program product according to claim 61, wherein said digital audio data coded using a synthesiser-architecture is wavetable (WT) audio.

\* \* \* \* \*

UNITED STATES PATENT AND TRADEMARK OFFICE
CERTIFICATE OF CORRECTION

PATENT NO. : 6,988,201 B1 Page 1 of 1
APPLICATION NO. : 09/445139
DATED : January 17, 2006
INVENTOR(S) : Changsheng Xu et al.

It is certified that error appears in the above-identified patent and that said Letters Patent is hereby corrected as shown below:

On title page, item 22, "Feb. 12" should read -- Jan. 28 --.

Signed and Sealed this

Thirty-first Day of October, 2006

JON W. DUDAS
*Director of the United States Patent and Trademark Office*